Oct. 30, 1962　　G. F. McLAUGHLIN　　3,061,443
FROZEN MILK SHAKE MIX
Filed Dec. 3, 1959

INVENTOR.
George F. McLaughlin
BY
Townsend and Townsend
Attorneys

United States Patent Office 3,061,443
Patented Oct. 30, 1962

3,061,443
FROZEN MILK SHAKE MIX
George F. McLaughlin, 45 Ketch Road,
Newport Beach, Calif.
Filed Dec. 3, 1959, Ser. No. 857,023
6 Claims. (Cl. 99—137)

This invention relates to a new frozen food product and more particularly the invention relates to a frozen milk shake mix which is capable of being stored in its frozen state and then thereafter being disintegrated by beating or otherwise to a liquid state for consumption. In conventional practice a milk shake may be made by mixing desired portions of fresh milk, ice cream or ice milk and flavoring together to provide a chilled, relatively aerated beverage adapted for immediate consumption. Milk shakes can be made with widely varying recipes to provide relatively thicker or thinner beverage consistencies. There are relatively richer or leaner milk fat and other food content.

The principal object of the present invention is to provide a frozen milk shake mix which may be stored in its frozen state until it is desired to be used.

Another object of the present invention is to provide a ready-to-use frozen, pre-mixed, single serving milk shake package which eliminates the need for the keeping on hand of various individual ingredients such as fresh milk, ice cream, and flavoring which constitute the makeup of a conventional milk shake.

A further object of the present invention is to provide an instant frozen milk shake mix that may be used equally as well in the home as in the so-called ice cream parlor or soda fountain.

A still further object of the present invention is to provide a frozen milk shake mix that so long as the ingredients of the milk shake mix remain hard frozen, the same may be shipped, stored, or stocked for sale in stores, super markets, ice cream parlors, and soda fountains or other such outlets.

Other important objects of the present invention will become apparent upon reading the following specification and referring to the accompanying drawings in which similar characters of reference represent corresponding parts in each of the several views.

Figure 1:
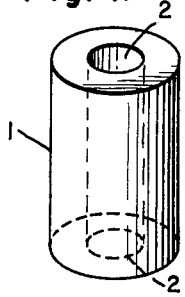
FIG. 1 shows a side elevation view of the frozen slug.
Figure 2:
FIG. 2 shows a side elevation view of the pressed plug.
Figure 3:
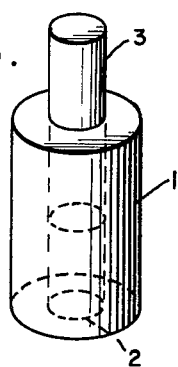
FIG. 3 shows an elevated composite view of the pressed plug partially inserted in the frozen slug.
Figure 4:
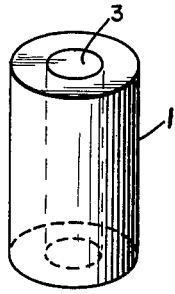
FIG. 4 is a side elevation view showing a composite with the pressed plug inserted completely within the frozen slug.

Reference will hereinafter be made to the terms "dry powdered ice cream" and "dry powdered ice milk." Such products are conventional and well understood in the trade. However, by way of example, the following typical formulations for dry powdered ice cream and dry powdered ice milk appear below:

| Ingredients | Percentage by Weight | |
|---|---|---|
| | Ice Cream | Ice Milk |
| Butter-fat | 27.5 | 12.5 |
| Moisture ($H_2O$) | 1.5 | 1.5 |
| Non-fat dry milk solids | 29.0 | 39.0 |
| Sugar | 41.4 | 45.7 |
| Stabilizer | 0.6 | 1.3 |

A frozen milk shake mix of the present invention may be prepared according to the following procedural steps. Initially, the desired frozen milk shake is prepared by adding to and thoroughly mixing in water the desired flavor which may be vanilla, chocolate, strawberry, or any other desired flavoring. The flavoring-water mixture is then poured into a freezing mold or otherwise caused to be hard-frozen into a tubular or thick-walled, hollow, cylindrical body or slug 1.

A quantity of conventional dry powdered ice cream mix or ice milk mix is pressed into the form of an elongated plug 3 of an exact size that may be press-fitted into the hollow core 2 of the frozen, flavored water slug. This may be carried out in a conventional pressure mold, not shown, under a pressure of perhaps 300 lbs. per square inch. As above noted, plug 3 of the compressed, dried, powder is formed so that it will fit snugly inside the thick-walled, hollow cylinder 1 formed of the flavored water mixture. The slug 1 with the compressed, powdered plug 3 is preferably maintained at a temperature well below freezing such as between (−) 20° F. to 0° F. until actual readiness for use.

One satisfactory example of the percentages of ingredients of the frozen milk shake suitable for an individual serving is as follows:

| Ingredients | Quantity | Percentage by Weight |
|---|---|---|
| Water | 7 oz. liquid (140 grams) | 45.3 |
| Flavoring | 1 oz. liquid (27 grams) | 8.8 |
| Dry powder mix | (142 grams) | 45.9 |

It should in no way be construed that the above composition limits percentages of ingredients nor the above procedure for preparation of the mix limits the method in which the mix may be prepared. One suitable range for the ingredients has been found to be between about 40%–60% of water, between about 5%–15% of flavoring and about 40%–60% of dry powdered mix. Other suitable ranges are also contemplated as being within the scope of the present invention. Sometimes hereinafter the term "ice cream mix" will also include the leaner mixes which the trade may regard as "ice milk" mixes.

Studies of which I am aware indicate that a milk shake should ideally be served at a temperature of 27° F. at which point the tiny ice crystals which form provide the desired texture to the beverage. It is considered important to the use of the product herein disclosed and in the practice of making a milk shake as herein taught, that the hard frozen pre-mix body consisting of the flavored ice slug 1 and the core slug 2 be liquified without raising the temperature of the mix to above approximately 27° F.

Figure 5:
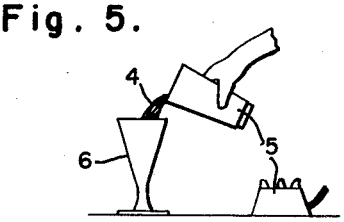
FIG. 5 is a view of the homogenized milk shake being poured from the blendor into a serving glass.

Consequently, it is recommended that the hard frozen slug comprising the cylindrical body of ice 1 and hard core of dry powder mix 2 be converted to liquified beverage form by placing the same in a beater or high-speed food blender 5 type unit, the action thereof will shave or chip the frozen mix into a liquified mass of the desired creaminess and consistency, preferably at a temperature close to 27° F. and can be then poured into a serving container as shown in FIG. 5.

It is also contemplated that the hard frozen slug could be converted to liquid form by ultra-sonic vibrations.

Although the foregoing invention has been described in some detail by way of illustration and example for the purpose of clarity and understanding, it is understood that certain changes and modifications may be practiced within the spirit of the invention as limited only by the scope of the appended claims.

What is claimed is:

1. In the art of frozen foods a frozen milk shake concentrate comprising a discrete hard-frozen body of water and flavoring and a discrete, solidly compressed, dry powdered body selected from the group consisting of ice cream and ice milk mix, said hard-frozen body substantially surrounding and retaining said compressed body.

2. The combination of claim 1 and wherein said frozen milk shake concentrate is composed by weight between about 40% to 60% of said frozen water and flavoring body and the balance by weight of the package is composed of the dry powdered mix.

3. The combination of claim 1 and wherein said frozen milk shake concentrate is composed by weight of between about 40% to 60% of said water, between about 5% to 15% of said flavoring and between about 40% to 60% of said dry powdered mix.

4. In the art of frozen food concentrate the combination of a frozen, hollow, cylindrical slug consisting of a mixture of water and flavoring and a discrete solidly compressed, dry powdered plug selected from the group consisting of dry powdered ice cream and dry powdered ice milk, said plug located within said hollow, cylindrical slug.

5. The combination of claim 4 and wherein said frozen, hollow, cylindrical slug comprises 40% to 60% by weight of said concentrate and the balance by weight of the concentrate is composed of the dry, powdered mix.

6. The combination of claim 4 and wherein said frozen, hollow cylindrical slug is composed of between about 40% to 60% water by weight of the concentrate and 5% to 15% flavoring by weight of the concentrate; and the dry powdered mix is composed of between about 40% to 60% dry powdered mix by weight of the package.

References Cited in the file of this patent

UNITED STATES PATENTS

| | | |
|---|---|---|
| 1,781,249 | Scholl | Nov. 11, 1930 |
| 1,869,810 | Hicks | Aug. 21, 1932 |
| 2,330,884 | Harriman | Oct. 5, 1943 |

FOREIGN PATENTS

| | | |
|---|---|---|
| 658,854 | Great Britain | Oct. 17, 1951 |
| 692,701 | Great Britain | June 10, 1953 |